(12) United States Patent
Zhao

(10) Patent No.: US 10,713,798 B2
(45) Date of Patent: Jul. 14, 2020

(54) LOW-COMPLEXITY MOTION DETECTION BASED ON IMAGE EDGES

(71) Applicant: SHANGHAI XIAOYI TECHNOLOGY CO., LTD., Shanghai (CN)

(72) Inventor: Lili Zhao, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 47 days.

(21) Appl. No.: 14/828,733

(22) Filed: Aug. 18, 2015

(65) Prior Publication Data

US 2017/0004629 A1 Jan. 5, 2017
US 2020/0175692 A9 Jun. 4, 2020

(30) Foreign Application Priority Data

Jul. 24, 2015 (CN) .......................... 2015 1 0441049

(51) Int. Cl.
*G06T 7/246* (2017.01)

(52) U.S. Cl.
CPC .... *G06T 7/246* (2017.01); *G06T 2207/30232* (2013.01); *G06T 2207/30242* (2013.01)

(58) Field of Classification Search
CPC ........... G06T 7/246; G06T 2207/10016; G06T 2207/30232; G06T 2207/30242
See application file for complete search history.

(56) References Cited

U.S. PATENT DOCUMENTS

| | | | | |
|---|---|---|---|---|
| 5,313,295 A | * | 5/1994 | Taniguchi | G01S 3/7864 348/143 |
| 5,815,199 A | * | 9/1998 | Palm | H04N 5/217 348/143 |
| 6,128,047 A | * | 10/2000 | Chang | H04N 5/145 348/699 |
| 8,405,780 B1 | * | 3/2013 | Schaem | H04N 9/75 348/576 |
| 8,681,870 B2 | * | 3/2014 | Takada | H04N 19/56 375/240.16 |
| 2004/0000996 A1 | * | 1/2004 | Addy | G08B 25/008 340/539.17 |

(Continued)

FOREIGN PATENT DOCUMENTS

CN 1900881 A 1/2007

OTHER PUBLICATIONS

Canny, John "A Computational Approach to Edge Detection", 1986, IEEE Transactions on Pattern Analysis and Machine Intelligence, vol. PAMI-8, Iss: 6, 679-698.*

(Continued)

*Primary Examiner* — Katrina R Fujita
(74) *Attorney, Agent, or Firm* — Cantor Colburn LLP

(57) ABSTRACT

A system for detecting a motion event based on images. The system acquires a first image and a comparison image, and generates a first edge image and a comparison edge image based on the first image and the comparison image. The system also determines the difference between the first edge image and the comparison edge image. The system indicates a motion event if the difference between the first edge image and the comparison edge image meets or exceeds a threshold.

10 Claims, 9 Drawing Sheets

(56) References Cited

U.S. PATENT DOCUMENTS

| | | | | |
|---|---|---|---|---|
| 2005/0074140 A1* | 4/2005 | Grasso | G06T 5/00 | 382/103 |
| 2006/0190750 A1* | 8/2006 | Maggi | G06F 1/3203 | 713/320 |
| 2006/0291695 A1* | 12/2006 | Lipton | G06K 9/00771 | 382/103 |
| 2007/0070243 A1* | 3/2007 | Zhu | H04N 5/208 | 348/448 |
| 2009/0154807 A1* | 6/2009 | Rossato | G06K 9/38 | 382/173 |
| 2010/0034484 A1* | 2/2010 | Kido | G06K 9/6202 | 382/294 |
| 2010/0098339 A1* | 4/2010 | Kido | G06K 9/6253 | 382/199 |
| 2014/0147044 A1* | 5/2014 | Takada | G06T 7/40 | 382/173 |
| 2016/0037061 A1* | 2/2016 | Lim | H04N 5/23229 | 348/241 |

OTHER PUBLICATIONS

Ogawa et al. "Efficient Canny edge detection using a GPU." Networking and Computing (ICNC), 2010 First International Conference on. IEEE, 2010.*

Dubuisson et al. "A modified Hausdorff distance for object matching." Proceedings of 12th international conference on pattern recognition. vol. 1. IEEE, 1994. (Year: 1994).*

Jiang et al. "Edge detection in range images based on scan line approximation." Computer vision and image understanding 73.2 (1999): 183-199. (Year: 1999).*

Pressigout et al. "Real-time hybrid tracking using edge and texture information." The International Journal of Robotics Research 26.7 (2007): 689-713. (Year: 2007).*

Zakhor et al. "Edge-based 3-D camera motion estimation with application to video coding." IEEE Transactions on Image Processing 2.4 (1993): 481-498. (Year: 1993).*

* cited by examiner

LOW-COMPLEXITY MOTION DETECTION BASED ON IMAGE EDGES

CROSS-REFERENCE TO RELATED APPLICATION

This application is based upon and claims the benefit of priority from Chinese Patent Application No. 201510441049.5, filed on Jul. 4, 2015, the disclosure of which is expressly incorporated herein by reference to its entirety.

TECHNICAL FIELD

The present disclosure generally relates to the field of digital images and, more specifically, to detecting motion based on data at the edges of digital images.

BACKGROUND

Video monitoring devices monitor premises for various purposes, including, e.g., security monitoring, infant or elderly monitoring, videoconferencing, etc. The video feed may be constantly or periodically monitored by security personnel, and/or recorded for later review.

The use of motion detection technology that can automatically detect moving events in the video may decrease monitoring costs and improve the efficiency and sensitivity of monitoring by alerting or otherwise providing notice of significant events. When a motion event, such as a person entering a secure area, is detected, the motion detector may begin a video feed, and/or begin recording the video, or otherwise alert security personnel of the potential intrusion.

Motion detection technology has been playing an increasingly important role in the technology of video recording. Recently, small-sized, portable, lightweight smart video recorders that incorporate motion detection technology have been developed.

Traditional motion detection methods can generally be categorized into two groups: methods based on pixel values and methods based on the optical flow of pixels. The methods based on pixel values detect motion information in the video frames by detecting changes in values of a pixel or group of pixels over time. This type of method may include, for example, background subtraction or temporal frame differencing. Background subtraction methods first generate a background image based on historical image data and then detect motion by comparing the current frame with the background image. Temporal frame differencing methods calculate pixel value differences between two or three successive frames and detect motion areas in which the calculated pixel value differences meets or exceeds a threshold.

In methods based on optical flow, a motion vector (i.e., a flow vector) is assigned to each pixel of the image. If there is no moving object, the change in the motion vectors in the whole image is continuous. On the other hand, if there is at least one moving object, the motion vectors of the moving object(s) are different from that of neighboring area. The area(s) of the moving object(s) may be detected based on such differences.

The methods based on pixel values generally rely on less complex algorithms than the methods based on optical flow, but may deliver lower accuracy. On the other hand, although the methods based on optical flow may provide better performance, they usually require hardware with high computational capacity in order to analyze images in real time, which is difficult implemented on small-sized, portable, lightweight video recorders.

Another advantage of the optical flow methods is that false detections from light interference may be reduced or avoided. Methods based on pixel values (including both background subtraction and temporal frame differencing methods) can be very sensitive to image changes due to some irrelevant motion, such as wind, false motion due to light reflections, or other interference, as described below. On the other hand, as described below, optical flow methods may be very sensitive to image noise. In addition, they may require extensive computational resources because of the high complexity of the algorithm. Accordingly, real-time processing video frames using an optical flow method may require specialized hardware.

(1) Changes in Ambient Light

A false alarm may be generated when the ambient light in the view of the video recorder is suddenly changed, for example, when room lighting is turned on or off. To reduce this type of false alarm, traditional technology may determine the areas of the image in which pixel values have changed; if all (or a majority of) the pixel values in the image have changed, such change may be attributed to the ambient lighting and an alert may not be generated. A problem with this approach is that a motion event causing changes in majority of the pixels (e.g., motion close to the video camera) may be missed.

(2) Irrelevant Movement

Traditional motion detection technology may give false alarms for image changes due to irrelevant movement, rather than movement in which the monitor may be interested. For example, images may change due to the motion of trees or plants due to wind. To reduce this type of false alarm, traditional motion detection technology may determine the number of the pixels whose values have changed; if the calculated number is lower than a threshold, an alarm may not be generated. A problem with this approach is that it may miss some relevant motion that causes only a small change in the image, such as a moving object that is far away from the video camera.

(3) Image Noise

While capturing images, an image sensor may generate noise due to many factors, including environmental factors (e.g., light conditions etc.) and hardware limitations (e.g., sensor temperature, etc.). Noise may be distributed across the whole image, and may cause changes that can be misinterpreted as motion. Traditional motion detection technology may generate a false alarm due to such noise.

There remains a need for motion detection technology that can be implemented on small-sized, portable, lightweight video recorders to meet the challenges discussed above.

SUMMARY

Consistent with embodiments of this disclosure, there is provided a method for detecting a motion event. The method may include acquiring a first image; obtaining a comparison image; identifying edge pixels in the first image; generating a first edge image by assigning a first pixel value to the edge pixels of the first image and a second pixel value to non-edge pixels of the first image, the first pixel value being different with the second pixel value; identifying edge pixels in the comparison image; generating a comparison edge image by assigning the first pixel value to the edge pixels of the comparison image and the second pixel value to non-edge pixels of the comparison image; determining difference between the first edge image and the comparison edge image; determining whether the difference meets or exceeds a first threshold; and indicating that a motion event occurs if the difference meets or exceeds the first threshold.

Consistent with embodiments of this disclosure, there is further provided a device or system for detecting a motion event. The device or system includes a processor and a memory storing programming for execution by the processor. The processor is configured for the device or system to acquire a first image; obtain a comparison image; identify edge pixels in the first image; generate a first edge image by assigning a first pixel value to the edge pixels of the first image and a second pixel value to non-edge pixels of the first image, the first pixel value being different with the second pixel value; identify edge pixels in the comparison image; generate a comparison edge image by assigning the first pixel value to the edge pixels of the comparison image and the second pixel value to non-edge pixels of the comparison image; determine difference between the first edge image and the comparison edge image; determine whether the difference meets or exceeds a first threshold; and indicate that a motion event occurs if the difference meets or exceeds the first threshold.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

DESCRIPTION OF DRAWINGS

The methods, systems, and/or programming described herein are further described in terms of exemplary embodiments. These non-limiting exemplary embodiments are described in detail with reference to the drawings, wherein.

DETAILED DESCRIPTION

Figure 1:
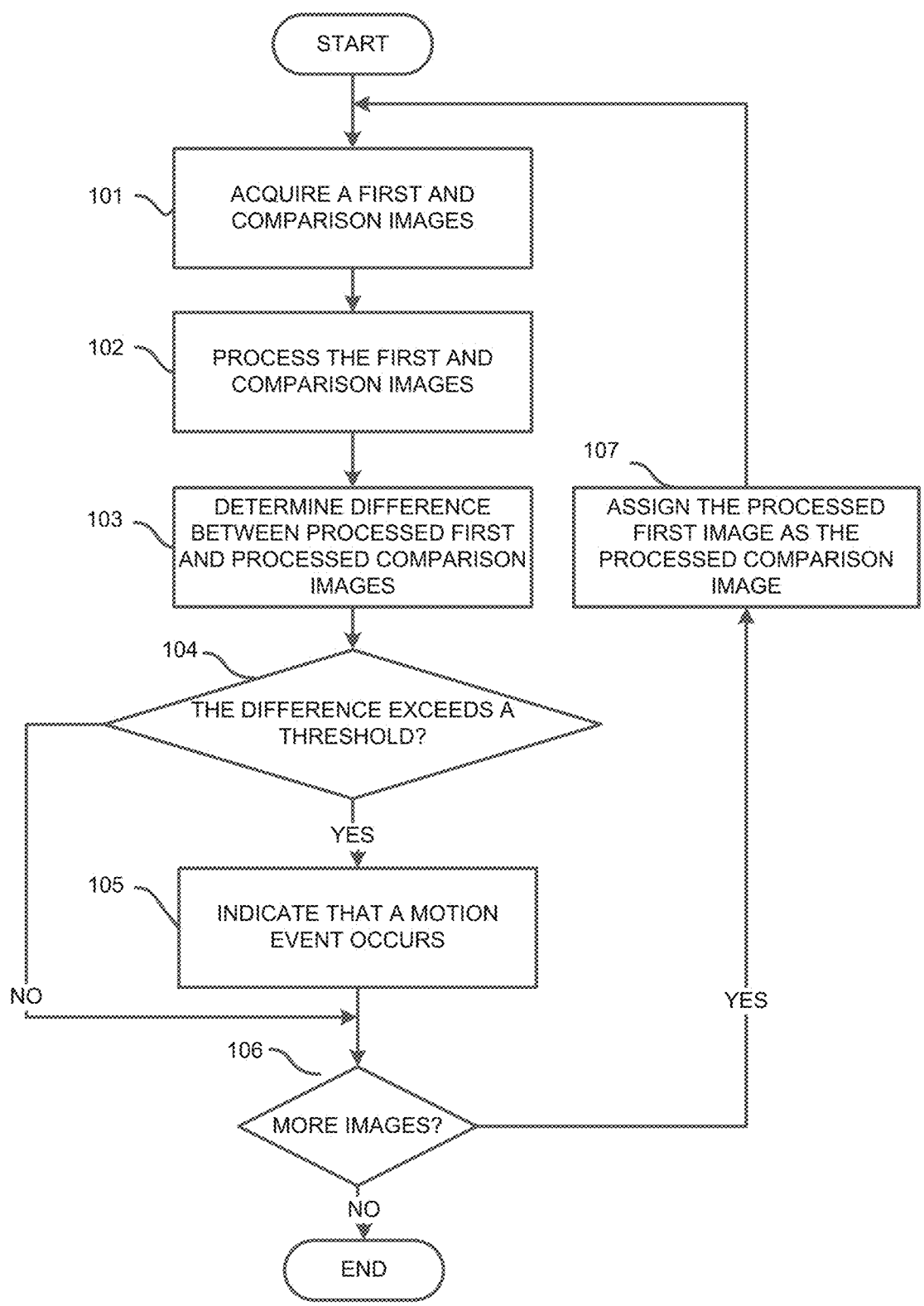
FIG. 1 is a flowchart of an exemplary process for detecting a motion event according to some embodiments.

Reference will now be made in detail to the disclosed embodiments, examples of which are illustrated in the accompanying drawings. Wherever convenient, the same reference numbers will be used throughout the drawings to refer to the same or like parts.

The objects, features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended as a definition of the limits of the invention. As used in the specification and in the claims, the singular form of "a," "an" and "the" include plural referents unless the context clearly dictates otherwise.

Embodiments of the present disclosure provide methods, systems, and articles of manufacture, such as non-transitory computer-readable media, for detecting a motion event based on image edges. Edges are lines of points in a digital image where discontinuities occur, such as a sharp change in color or brightness.

FIG. 1 is a flowchart of an exemplary process for detecting a motion event. At 101, a first image and a comparison image may be acquired. The first image may be an image or image frame captured by an image sensor in real time. In other embodiments, the first image may be an image or age frame stored in memory. The comparison image may be an image or image frame captured by the image sensor earlier than the first image. In other embodiments, the comparison image may be a reference image or image frame stored in memory. In some embodiments, the comparison image may be a processed image as disclosed below. For example, the comparison image may be acquired by, for example, the methods discussed later with regard to step 107. In some embodiments, the first image and the comparison image may be obtained by extracting them from a video file.

In some embodiments, the first image and the comparison image may have a same resolution. In some embodiments, only a portion of the first image and a corresponding portion of the comparison image may be acquired.

Figure 3A:
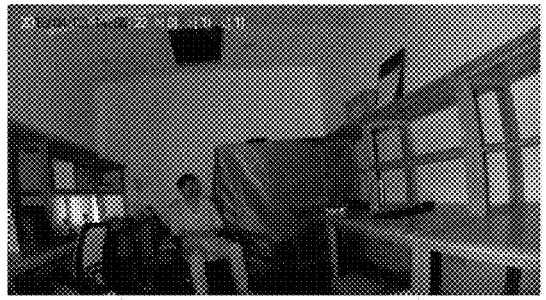
FIGS. 3(A)-3(F) are exemplary images according to some embodiments.
Figure 3B:

FIG. 3(A) is an exemplary image of the first image, and FIG. 3(B) is an exemplary image of the comparison image. In some embodiments, the first image, i.e., FIG. 3(A) is an image frame captured after the comparison image, i.e., FIG. 3(B).

Returning to FIG. 1, at 102, the first image and comparison image may be processed. Alternatively, only a portion of the first image and the corresponding portion of the comparison image may be processed. In some embodiments, the processed first image and processed comparison image may be saved in the memory for future use. In some embodiments, the first image and the comparison image may be upscaled or downscaled. Additionally or alternatively, certain pixel information (e.g., color information) may be removed from the first image and comparison image to reduce computing requirement.

In some embodiments, the processed first image and the processed comparison image may be edge images generated using an edge-identifying process. For example, edge pixels in the first image and comparison image may be identified by a convolution of a 2-D filter/kernel such as Roberts Cross or a Sobel formulation. Pixel information of non-edge pixels of the images may be removed. In some embodiments, the first image and comparison images may be processed to generate the processed first image and comparison image, based on a process for detecting edge pixels illustrated in FIG. 4.

Figure 4:
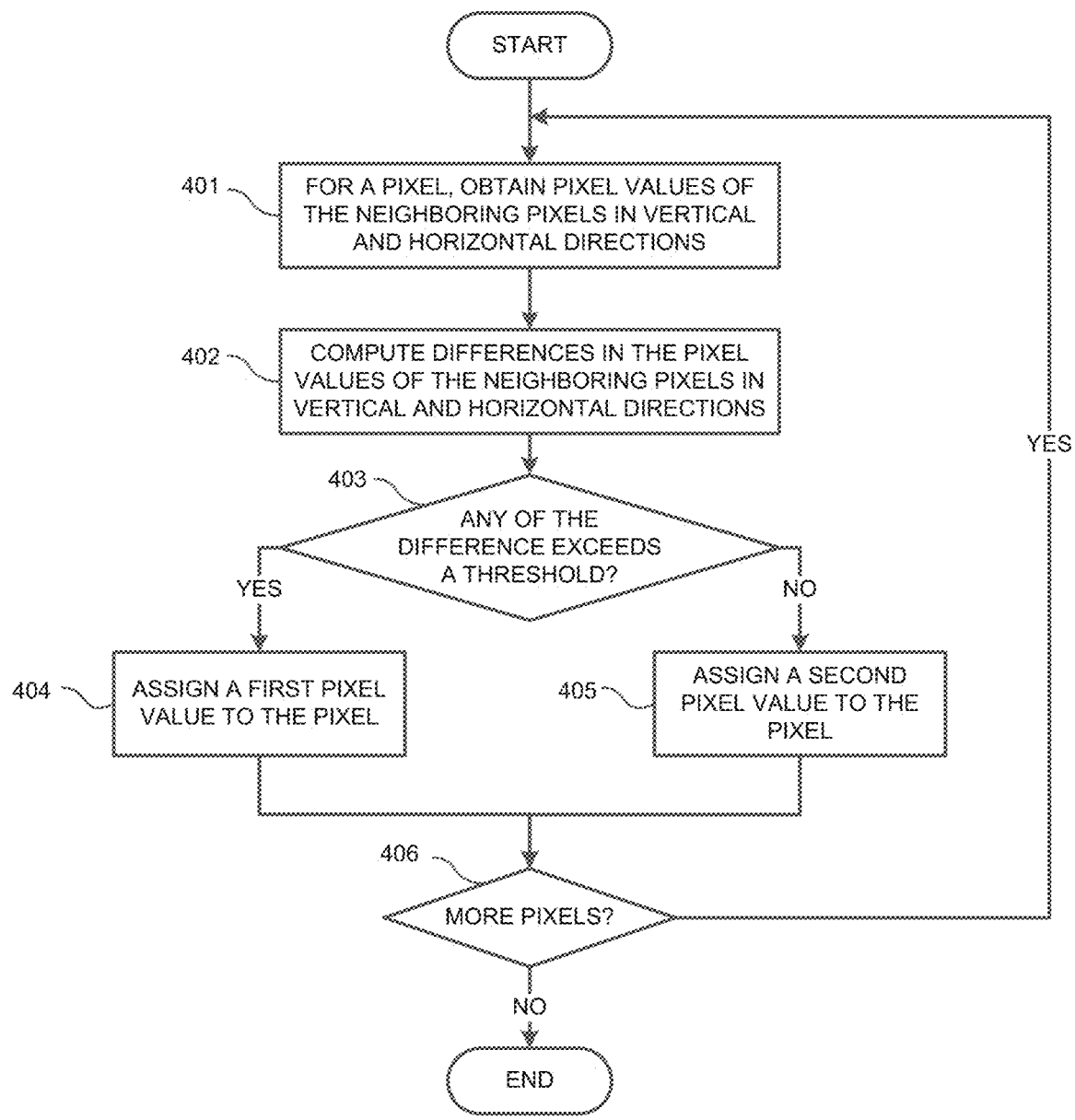
FIG. 4 is a flowchart of an exemplary process for generating an edge image according to some embodiments.

FIG. 4 is an exemplary flowchart of a process for detecting edge pixels and generating an edge image (i.e., a processed image). At 401, for each pixel of an image (e.g., the first image acquired at 101), the pixel values of its neighboring pixels may be obtained. For example, for pixel 501 (with the pixel value p(x, y)) shown in FIG. 5, the pixel values of the above pixel 503 and the bottom pixel 508 (i.e., p(x, y−1) and p(x, y+1), respectively) and the pixel values of the left pixel 505 and the right pixel 506 (i.e., p(x−1, y) and p(x+1, y), respectively) may be obtained. At 402, the difference in pixel value between any two of the neighboring pixels may be computed. In some embodiments, the difference in pixel value between the neighboring pixels along the vertical direction, and/or the difference in pixel value between the neighboring pixels along the horizontal direction may be computed. For example, the differences Delta$_h$ and Delta$_v$ between the neighboring pixels may be computed based on Equations 1 and 2 (in connection to FIG. 5) as follows:

$$\text{Delta}_h = |p(x,y-1) - p(x,y+1)| \qquad (1)$$

$$\text{Delta}_v = |p(x-1,y) - p(x+1,y)| \qquad (2)$$

At 403, it may be determined whether any of the computed differences meets or exceeds a threshold. For example, whether the computed Delta$_h$ or Delta$_v$ meets or exceeds a threshold may be determined. In some embodiments, the threshold may be pre-determined. In some embodiments, the threshold may be adjusted by a user. The threshold can be any number between the minimum and maximum image pixel values. In other embodiments, the threshold may be any number between the lowest and highest possible pixel values for the image. In some embodiments, the minimum or lowest possible pixel value is 0 (black), and the maximum or highest possible pixel value is 255 (white). In some embodiments, the threshold may be any number between 1 and 255. In other embodiments, the threshold may be restricted to subranges 1 to 50, 51 to 100, 101 to 150, 151 to 200, or 201 to 255.

At 404 if any of computed difference(s) meets or exceeds the threshold (403, "YES"), the pixel (e.g., pixel 501) may be identified as an edge pixel. A new pixel value (a first pixel value) may then be assigned to this identified edge pixel. In some embodiments, the first pixel value may be any number between the minimum pixel value and the maximum pixel value among the pixels in the image. In other embodiments, the first pixel value may be any number between lowest and highest possible pixel values for the image. In some embodiments, the first pixel value may be the maximum or the highest possible pixel value. On the other hand, if the computed difference does not exceed the threshold (403, "NO"), at 405, the pixel (e.g., pixel 501) may be identified as a non-edge pixel. A second pixel value may then be assigned to this non-edge pixel. In some embodiments, the second pixel value may be any number between the minimum pixel value and the maximum pixel among the pixels in the image. In other embodiments, the first pixel value may be any number between lowest and highest possible pixel values for the image. In some embodiments, the second pixel value may be the minimum or lowest possible pixel value. In some embodiments, the minimum or lowest possible pixel value is 0.

Figure 3C:
Figure 3D:
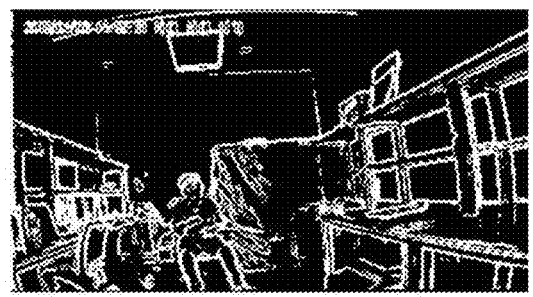

At 406, it is determined whether the process for all pixels in the image (or a portion thereof) is completed. FIG. 3(C) and FIG. 3(D) show examples of the processed first image (i.e., the first edge image) and processed comparison image (i.e., the comparison edge image), respectively, generated according to some embodiments disclosed herein, with the threshold being 50, the first pixel value being 255 (white), and the second pixel value being 0 (black).

Figure 2:
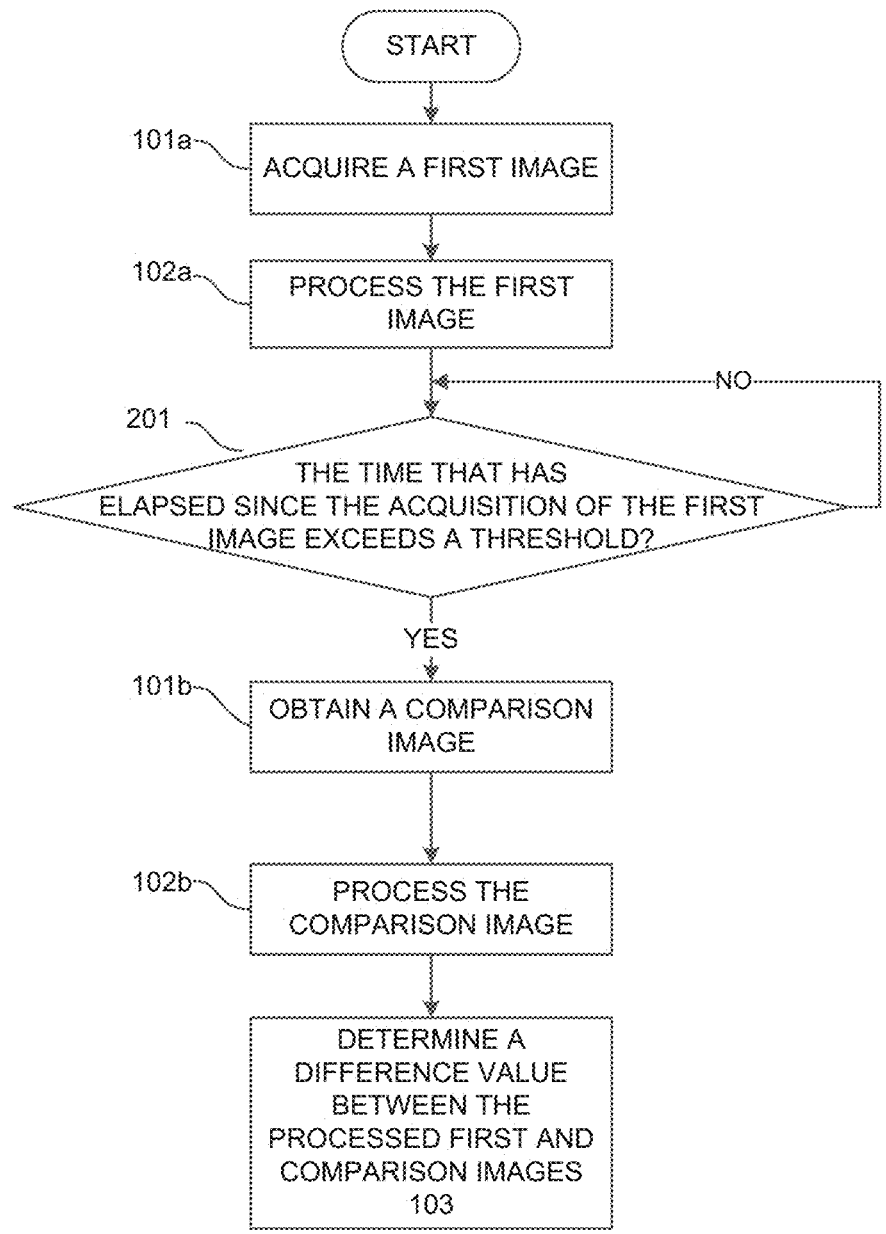
FIG. 2 is a flowchart of an exemplary process for acquiring and processing images according to some embodiments.

In some embodiments, the process of FIG. 1 may be modified as illustrated in FIG. 2. At 101a, the first image is acquired. At 102a, the acquired first image may be processed, as described elsewhere in this disclosure. At 201, it is determined whether the time that has elapsed since acquiring the first image meets or exceeds a threshold period of time. For example, if the first image is acquired at time t1, and the processed first image is obtained at time t2, the interval between time t1 and time t2 may be computed as t2−t1. It may then be determined whether the interval (t2−t1) meets or exceeds a threshold period of time. The threshold period of time may be pre-determined, or may be adjusted by a user. In some embodiments, the threshold may be any period of time between 0 and 1000 milliseconds. In other embodiments, depending upon the application, the threshold may be restricted to subranges of 0 to 200 milliseconds, 200 to 400 milliseconds, 400 to 600 milliseconds, 600 to 800 milliseconds, 800 to 1000 milliseconds, 0 to 1 second, 1 to 20 seconds, 20 to 40 seconds, 40 to 60 seconds, 0 to 1 minute, 1 to 5 minutes, 5 to 10 minutes, etc. If the time that has elapsed since acquiring the first image (e.g., the image shown in FIG. 3(A)) does not exceed the threshold, a comparison image or a processed comparison image (e.g., the image shown in FIG. 3(B) or the image shown in FIG. 3(D)), which was acquired by the camera before the first image may not be obtained until the time interval (t2−t1) reaches or exceeds the threshold period of time. On the other hand, if the time that has elapsed since acquiring the first image meets or exceeds the threshold, a comparison image may be obtained (at 101b) and processed (at 102b), as described elsewhere in this disclosure with respect to steps 101 and 102, respectively. Processing may then continue as described below with respect to step 103.

Figure 3E:

Now returning to FIG. 1, at 103, the difference between the processed first image and the processed comparison image may be determined, and a difference image based on the processed first image and the processed comparison image may be generated. FIG. 3(E) is an exemplary difference image generated based on the processed first image (FIG. 3(D)) and processed comparison image (FIG. 3(C)) according to some embodiments disclosed herein.

For example, the processed comparison image may be subtracted from the processed first image (or vice versa) to obtain a difference image. In some embodiments, a difference image may be generated by assigning a first pixel value to the pixels in the processed first image that have a different pixel value from the corresponding pixels in the processed comparison image, and by assigning a second pixel value to the pixels in the processed first image that have the same pixel value as the corresponding pixels in the processed comparison image. The first pixel value and second pixel value may be any number between the minimum and maximum pixel values among the pixels of the images. In some embodiments, the first pixel value and second pixel value may be any number between the lowest possible and highest possible pixel values for the images. Alternatively, the first pixel value may be the maximum or highest possible pixel value, and the second pixel value may be the minimum or lowest possible pixel value. The maximum or highest possible pixel value may be 255 (white), and the minimum or lowest possible pixel value may be 0 (black).

Figure 3F:
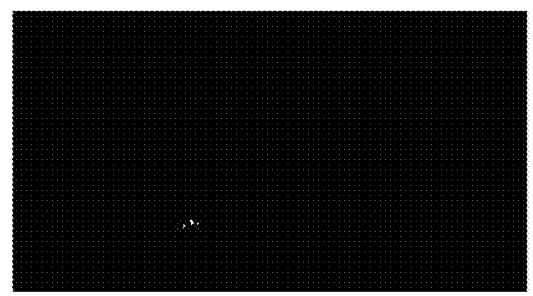

In some embodiments, noise from the processed first image and the processed comparison image may be reduced before the difference image is generated. FIG. 3(F) is an exemplary denoised difference image generated by reducing the noise from the difference image (FIG. 3(E)), in accordance with some embodiments disclosed herein.

Figure 6:
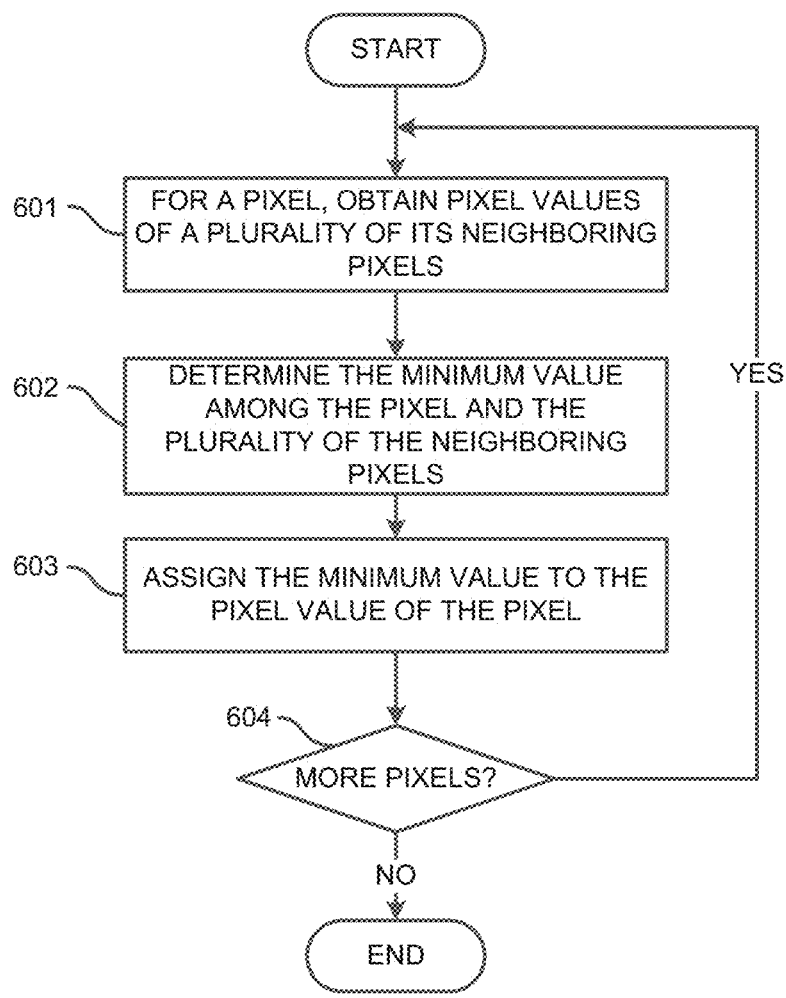
FIG. 6 is a flowchart of an exemplary erosion process according to some embodiments.

In some embodiments, for example, an erosion operation may be performed on the difference image to reduce noise as illustrated in FIG. 6. In some embodiments, the difference image may be a denoised by a noise reducing process as described elsewhere in this disclosure.

At 104, it may be determined whether the difference meets or exceeds a threshold. If the difference does not exceed the threshold, it may be indicated that no motion event has been detected. Alternatively, no indication may be given, unless the difference meets or exceeds the threshold. If the difference meets or exceeds the threshold, an indication that a motion event occurred may be given at 105. An alert indicating the motion event may be also generated and transmitted to a user, a third party (e.g., the police or responsible security personnel), or service provider, etc., as disclosed elsewhere in this disclosure.

At 106, it may be determined whether there is a new image available for analyzing. For example, it may be determined whether to acquire a new image captured by the image sensor in real time. If there is a new image to be analyzed, the new image may be acquired as the first image, and a new comparison image may also be obtained, as described elsewhere in this disclosure with respect to step 101. Steps 102 through 106 (if applicable) may also be performed, as disclosed elsewhere in this disclosure. In other embodiments, the new first image may be acquired at 101 and processed at 102, as described elsewhere in this disclosure.

At 107, the previously processed first image ("old" first image) or the previously processed comparison image ("old" comparison image) may be assigned as the processed "new" comparison image. Steps 103 through 106 (if applicable) may also be performed, as described elsewhere in this disclosure, using the new first image.

Figure 7:
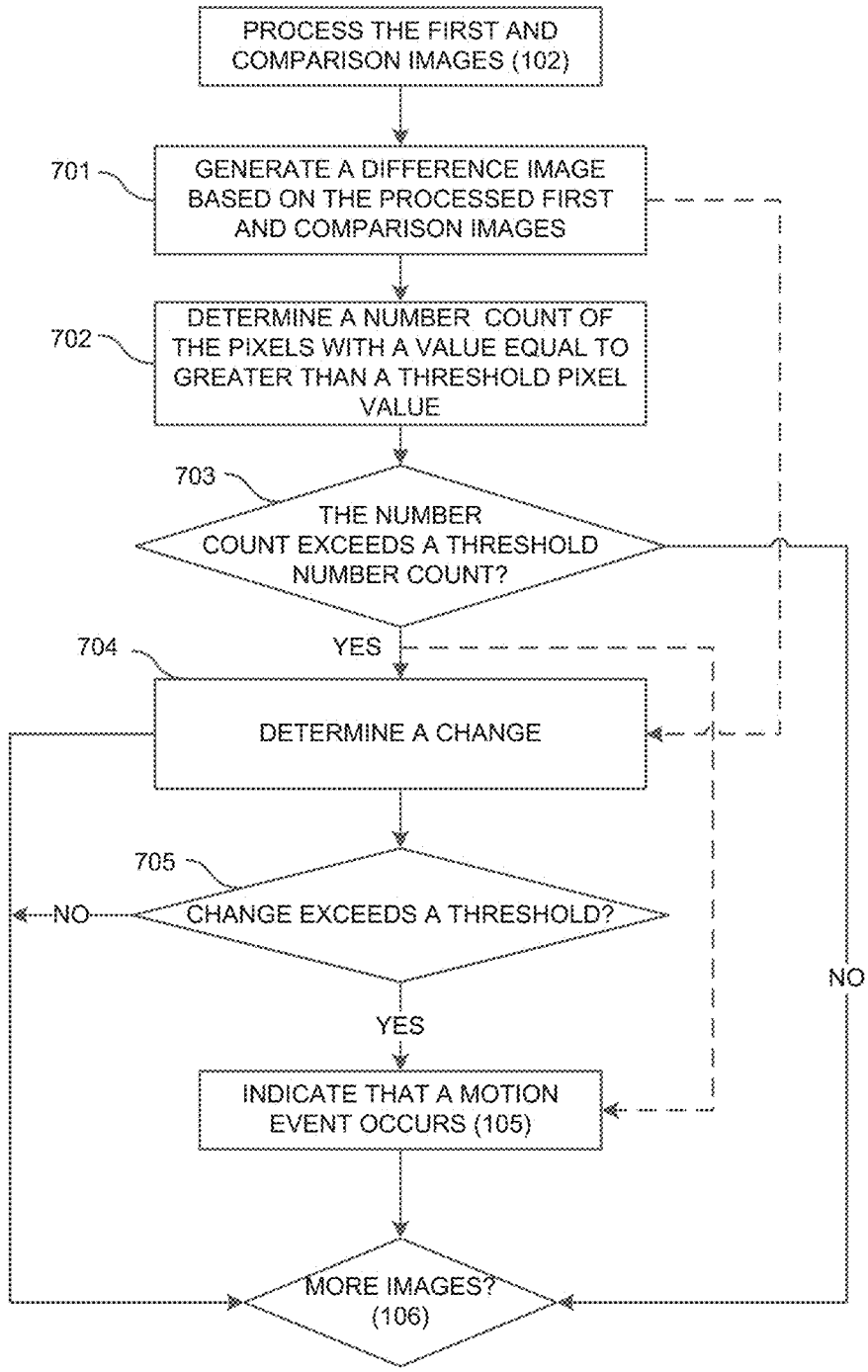
FIG. 7 is a flowchart of an exemplary process for detecting differences between images according to some embodiments.

In some embodiments, steps 104 and 105 may be performed based on a process illustrated in FIG. 7. At 701, a difference image is generated based on the processed first image and the processed comparison images, as described elsewhere in this disclosure. Noise from the processed first image and comparison image may be reduced before the difference image is generated and the difference is determined. For example, an erosion process may be performed on the difference image as illustrated in FIG. 6 to reduce noise.

Figure 5:
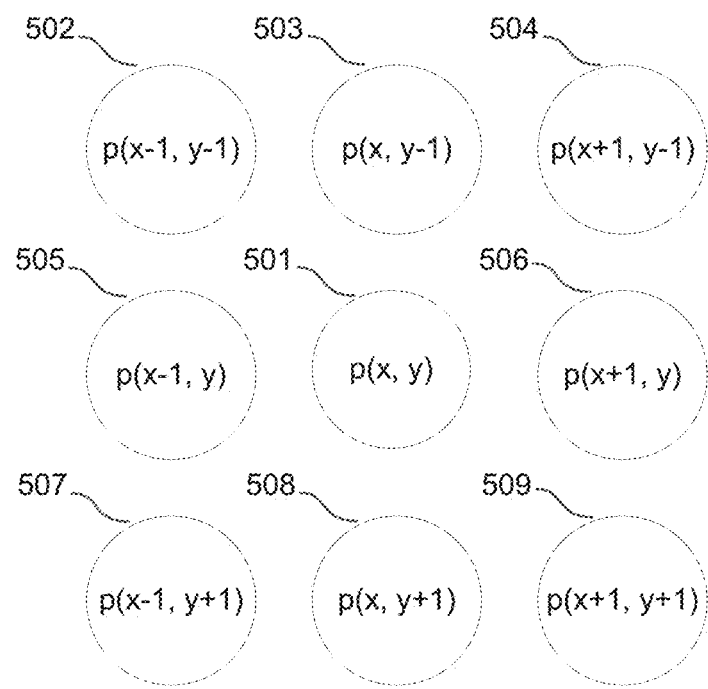
FIG. 5 is a diagram illustrating a pixel and its neighboring pixels according to some embodiments.

FIG. 6 is a flowchart of an exemplary erosion process. At 601, for each of pixels of the difference image (or a portion thereof), the pixel values of the pixel and a plurality of its neighboring pixels may be obtained. For instance, for pixel 501 as shown in FIG. 5, the pixel values of pixels 501, 502, 503, and 504 (i.e., p(x, y), p(x−1, y−1), p(x, y−1), and p(x−1, y), respectively) may be obtained. At 602, a minimum value among the obtained pixel values may be determined. For example, the minimum value (or pe(x, y)) may be determined based on the following equation:

$$pe(x,y)=\min\{p(x,y),p(x-1,y-1),p(x,y-1),p(x-1,y)\} \quad (3)$$

At 603, the minimum value pe(x, y) may be assigned to the pixel 501. At 604, it may be determined whether there are more pixels that need processing. A denoised difference image may also be generated at the end of the erosion operation. In some embodiments, the erosion process on the difference image may be performed more than once to obtain a denoised difference image.

Returning to FIG. 7, at 702, a number count of the pixels in the difference image (or a portion thereof) that have a pixel value equal to or greater than a threshold pixel value may be determined. The threshold pixel value may be in the range or subranges described above in relation to FIG. 1.

At 703, it may be determined whether the number count meets or exceeds a threshold. The threshold may be predetermined. In other embodiments, the threshold may be adjusted by a user. The threshold may be any number. Depending on the application, for example, the threshold may be chosen to lie in the subrange between 1 to 10, 11 to 20, 21 to 30, 31 to 40, or 41 to 50, etc. If the number count does not exceed the threshold, it may be indicated that no motion event has been detected. Alternatively, no indication will be given unless the number count meets or exceeds the threshold. If the number count meets or exceeds the threshold, an indication that a motion event has occurred may be given at 105. An alert indicating the motion event may be also generated, as described above.

In some embodiments, after the difference image is generated, steps 702 and 703 may be skipped. Processing may then continue as described elsewhere in this disclosure, with respect to step 106.

Figure 8:
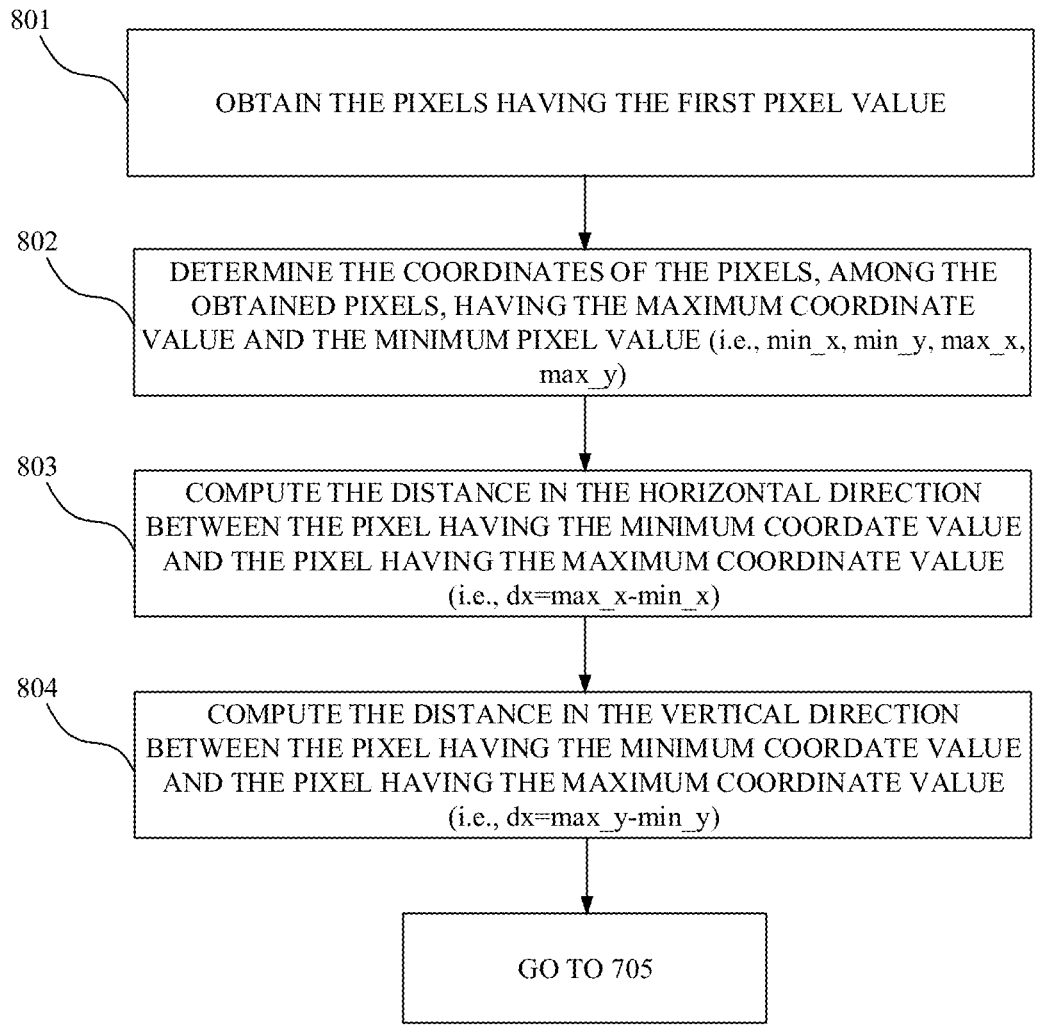
FIG. 8 illustrates an exemplary process for computing the distance between pixels.

A change area in the difference image may be determined at 704. The change may be determined by calculating an area comprising the pixels having the first pixel value, assigned above in step 404. In other embodiments, the change area may be estimated based on a distance (e.g., the maximum distance) between the pixels with the maximum and minimum coordinate values, among all pixels in the difference image (or a portion thereof). FIG. 8 illustrates an exemplary process for computing the distance in the vertical and/or horizontal direction between the pixels with maximum and minimum pixel values. At 801, the pixels in the difference image that have a pixel value having the first value may be obtained. At 802, the coordinates of the obtained pixels with the maximum and minimum coordinate values may be determined. For example, the coordinates (e.g., max_x and min_x in the horizontal direction and max_y and min_y in the vertical direction in the following equations) may be determined based on the following equations.

$$\max\_x = \max(X) \quad (4)$$

$$\min\_x = \min(X) \quad (5)$$

$$\max\_y = \max(Y) \quad (6)$$

$$\min\_y = \min(Y) \quad (7)$$

Wherein $X \in \{$the coordinates in the horizontal direction of the pixels with a pixel value greater than $0\}$ and $Y \in \{$the coordinates of the pixels in the vertical direction of the pixels with a pixel value greater than $0\}$. At 803 and 804, the distances in the horizontal and vertical directions between the obtained pixels having the maximum coordinate value and the minimum coordinate value may be computed. For example, the distance dx in the horizontal direction and distance dy in the horizontal direction may be determined based on the following equations:

$$dx = \max\_x - \min\_x \quad (8)$$

$$dy = \max\_y - \min\_y \quad (9)$$

After the distances are computed as described above, at 705, it is determined whether the change meets or exceeds a threshold. If the change does not exceed the threshold, it may be indicated that no motion event has been detected. Alternatively, no indication will be given unless the threshold is met or exceeded. For example, when the change meets or exceeds the threshold, an indication that a motion event occurred may be given as described elsewhere in this disclosure with respect to step 105. Processing may then continue at step 106, as described elsewhere in this disclosure.

Alternatively or additionally, at 705, whether either of the distances dx and dy calculated meets or exceeds a threshold distance is determined. In some embodiments, the threshold distance may be pre-determined. In some embodiments, the threshold distance may be any number between 1 to 10, 11 to 20, 21 to 30, 31 to 40, or 41 to 50, etc. If neither of distances dx and dy meets or exceeds the threshold distance, an indication of no motion event detected will be given. Alternatively, no indication will be givers unless the threshold is met or exceeded. For example, if either of the distances dx and dy meets or exceeds the threshold distance, an indication that a motion event occurred may be given at 105 as shown in FIG. 1. An alert indicating the motion event may also be generated and transmitted to the user, a third party (e.g., the police), or service provider, etc. Whether there is a new image that needs analyzing is also determined at 106, as described elsewhere in this disclosure.

Now returning again to 701, after the difference image is generated, a number count of the pixels in the difference image (or a portion thereof) with a pixel value that is equal to or greater than a threshold pixel value is determined at 702. At 703, whether the number count meets or exceeds a threshold is also determined, as described elsewhere in this disclosure. If the number count does not exceed the threshold, an indication of no motion event detected will be given. Alternatively, no indication will be given unless the threshold is met or exceeded. For example, when the number count meets or exceeds the threshold, a change area in the difference image is determined at 704 and whether the change area meets or exceeds a threshold is determined at 705, as described elsewhere in this disclosure. If the change area does not exceed the threshold, an indication of no motion event detected will be given. Alternatively, no indication will be given unless the threshold is met or exceeded. For example, if the change area meets or exceeds the threshold, an indication that a motion event occurred will be given at 105 as shown in FIG. 1. An alert indicating the motion event may also be generated and transmitted to the user, a third party (e.g., the police), or service provider, etc. Whether there is a new image that needs analyzing is also determined at 106, as described elsewhere in this disclosure.

In some embodiments, if the number count meets or exceeds the threshold (703), a maximum distance (or "distance") between the pixels with the maximum and minimum pixel values that are greater than 0, among the all pixels in the difference image (or a portion thereof) may be further determined at 704. Whether any of the distances calculated meets or exceeds a threshold distance may be also determined at 705, as described elsewhere in this disclosure. If neither of the calculated distances meets or exceeds the threshold distance, an indication of no motion event detected will be given. Alternatively, no indication will be given unless the threshold is met or exceeded. For example, if any of the calculated distances exceed the threshold distance, an indication that a motion event occurred will be given at 105 as shown in FIG. 1. Processing may then continue at step 106, as described elsewhere in this disclosure.

Now returning to step 105, the alert may include image and/or video data associated with the detected motion event. The alert may be transmitted to the user, a third-party (e.g., the police), or a service provider, etc.

Figure 9:
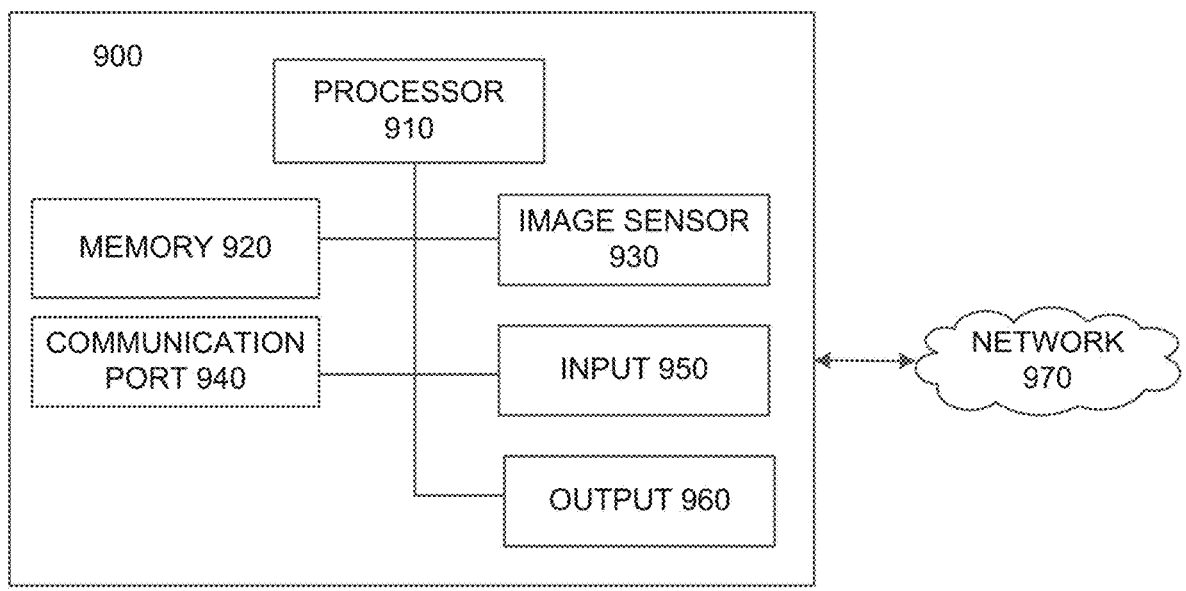
FIG. 9 is a block diagram of an exemplary system for detecting a motion event according to some embodiments.

FIG. 9 is a block diagram of an exemplary system 900 for detecting a motion event. System 900 may include one or more processors 910, memory 920, image sensor 930, communication port 940, input 950, and output 960. In operation, processor 910 may execute computer instructions (program code) and perform functions (e.g., one or more steps in FIGS. 1, 2, 4, 6, and 7) in accordance with techniques described herein. For example, processor 910 may receive and analyze the captured image data by image sensor 930 and determine whether the image data shows any moving objects. Memory 920 may store executable computer instructions (program code) and captured data such as still images and videos. Image sensor 930 may capture image data, such as still images and videos. Image sensor 930 may include, e.g., one or more CCD sensors or CMOS sensors configured to capture visible and/or invisible (e.g., infrared or ultraviolet) light. Communication port 940 may be a device configured to facilitate communications between system 100 and the user, third parties, or service providers, etc. Input 950 may be a device (e.g., a keyboard, keypad, touchscreen, and/or a mouse or other pointing device) configured to allow the user to enter input various types of information, and output 960 may be a device (e.g., a screen or display) configured to communicate information to the user.

Processor 910 may include or be part of one or more known processing devices such as, for example, a microprocessor. In some embodiments, processor 910 may include any type of single or multi-core processor, mobile device microcontroller, central processing unit, etc.

Memory 920 may include electronic memories such as random access memory (RAM), read-only memory (ROM), or other types of memory, in any combination. Memory 920 may also be viewed as what is more generally referred to as a "computer program product" having executable computer instructions (program code) in accordance with discussed techniques embodied therein. Examples of computer program products embodying aspects of the invention may include non-transitory computer-readable storage media such as hard drives, optical or magnetic disks, solid state memory, or other computer-readable media.

System 900 may be communicated with one or more user devices, third-parties (such as the police or fire station, etc.), or service providers (not shown) through network 970. Network 970 may include, or be part of any one or more of a variety of networks or other types of communication connections known to those skilled in the art. Network 970 may include a network connection, bus, or other type of data link, such as a hardwire or other connection known in the art. For example, network 970 may include or be part of the Internet, an intranet network, a local area network, or other wireless or other hardwired connection or connections (e.g., Bluetooth, WiFi, 4G, LTE cellular data networks, etc.) through which the components of system 900 may communicate.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the disclosure. The examples are to be construed as non-exclusive. Furthermore, the steps of the disclosed routines may be modified in any manner, including by reordering steps and/or inserting or deleting steps. In particular, non-dependent steps may be performed in any order, or in parallel. It is intended, therefore, that the specification and examples be considered as illustrative only, with a true scope and spirit being indicated by the following claims and their full scope of equivalents.

What is claimed is:

1. A method for detecting a motion event comprising:
acquiring a first image;
obtaining a comparison image;
identifying edge pixels in the first image;
generating a first edge image by assigning a first pixel value to the edge pixels of the first image and a second pixel value to non-edge pixels of the first image, the first pixel value being different from the second pixel value;
identifying edge pixels in the comparison image by:
obtaining, for each pixel in the comparison image, pixel values of two neighboring pixels;
computing a difference in pixel value between the two neighboring pixels;
determining whether the difference in pixel value meets or exceeds a first threshold; and
identifying the pixel as an edge pixel if the difference in pixel value meets or exceeds the first threshold;
generating a comparison edge image by assigning the first pixel value to the edge pixels of the comparison image and the second pixel value to non-edge pixels of the comparison image;
generating a difference image based on the first edge image and the comparison edge image;
reducing noise in the difference image by an erosion operation;
determining difference between the first edge image and the comparison edge image by obtaining pixels having the first pixel value in the difference image after noise reduction, wherein the difference comprises distances in the horizontal and vertical directions between the obtained pixels having the maximum coordinate value and the minimum coordinate value and a number count of the obtained pixels in the difference image;
determining whether the difference between the first edge image and the comparison edge image meets or exceeds a second threshold, the second threshold being adjustable by a user, wherein the determining whether the difference between the first edge image and the comparison edge image meets or exceeds a second threshold comprises:
determining whether distances in the horizontal or vertical directions between the obtained pixels having the maximum coordinate value and the minimum coordinate value meets or exceeds a third threshold,
determining whether a number count of the obtained pixels in the difference image meets or exceeds a fourth threshold; and
in response to that the difference is determined to meet or exceed the second threshold, generating an alert indicating that a motion event occurs, and transmitting the alert to a user device, the alert including image data associated with the motion event.

2. The method of claim 1, the first pixel value being a maximum pixel value among pixels in the first image or the comparison image, and the second pixel value being a minimum pixel value among pixels in the first image or the comparison image.

3. The method of claim 1, the obtaining the comparison image includes:
determining whether a time that has elapsed since acquiring the first image meets or exceeds a threshold period of time; and
obtaining the comparison image if the time meets or exceeds the threshold period of time.

4. The method of claim 1, wherein the generating the difference image based on the first edge image and the comparison edge image comprises:
identifying a first group of pixels in the first edge image that have a different pixel value from corresponding pixels in the comparison edge image;
identifying a second group of pixels in the first edge image that have a same pixel value as corresponding pixels in the comparison edge image; and
generating the difference image by assigning a first pixel value to the first group of pixels and a second pixel value to the second group, the first pixel value being different from the second pixel value.

5. A system for detecting a motion event comprising:
a memory storing instructions;
a processor configured to execute the instructions to:
acquire a first image;
obtain a comparison image;
identify edge pixels in the first image;
generate a first edge image by assigning a first pixel value to the edge pixels of the first image and a second pixel value to non-edge pixels of the first image, the first pixel value being different from the second pixel value;
identify edge pixels in the comparison image by:
obtaining, for each pixel in the comparison image, pixel values of two neighboring pixels;
computing a difference in pixel value between the two neighboring pixels;
determining whether the difference in pixel value meets or exceeds a first threshold; and
identifying the pixel as an edge pixel if the difference in pixel value meets or exceeds the first threshold;
generate a comparison edge image by assigning the first pixel value to the edge pixels of the comparison image and the second pixel value to non-edge pixels of the comparison image;
generate a difference image based on the first edge image and the comparison edge image;
reduce noise in the difference image by an erosion operation;
determine difference between the first edge image and the comparison edge image by obtaining pixels having the first pixel value in the difference image after noise reduction, wherein the difference comprises distances in the horizontal and vertical directions between the obtained pixels having the maximum coordinate value and the minimum coordinate value and a number count of the obtained pixels in the difference image;
determine whether the difference between the first edge image and the comparison image meets or exceeds a second threshold, the second threshold being adjustable by a user, wherein the determine whether the difference between the first edge image and the comparison edge image meets or exceeds a second threshold comprises:
determining whether distances in the horizontal or vertical directions between the obtained pixels having the maximum coordinate value and the minimum coordinate value meets or exceeds a third threshold,
determining whether a number count of the obtained pixels in the difference image meets or exceeds a fourth threshold; and if the difference meets or exceeds the second threshold, generate an alert indicating that a motion event occurs, and transmit the alert to a user device, the alert including image data associated with the motion event.

6. The system of claim 5, the first pixel value being a maximum pixel value among pixels in the first image or the comparison image, and the second pixel value being a minimum pixel value among pixels in the first image or the comparison image.

7. The system of claim 5, the obtaining the comparison image includes:
   determining whether a time that has elapsed since acquiring the first image meets or exceeds a threshold period of time; and
   obtaining the comparison image if the time meets or exceeds the threshold period of time.

8. The system of claim 5, wherein the generating a difference image based on the first edge image and the comparison edge image comprises:
   identifying a first group of pixels in the first edge image that have a different pixel value from corresponding pixels in the comparison edge image;
   identifying a second group of pixels in the first edge image that have a same pixel value as corresponding pixels in the comparison edge image; and
   generating the difference image by assigning a first pixel value to the first group of pixels and a second pixel value to the second group, the first pixel value being different from the second pixel value.

9. A non-transitory computer-readable storage medium storing instructions that, when executed by at least one processor, cause the at least one processor to perform a method for video monitoring, the method comprising:
   acquiring a first image and a comparison image;
   identifying edge pixels in the first image by:
      obtaining, for each pixel in the first image, pixel values of two neighboring pixels;
      computing a difference in pixel value between the two neighboring pixels;
      determining whether the difference in pixel value meets or exceeds a first threshold; and
      identifying the pixel as an edge pixel if the difference in pixel value meets or exceeds the first threshold;
   generating a first edge image by assigning a first pixel value to the edge pixels of the first image and a second pixel value to non-edge pixels of the first image, the first pixel value being different from the second pixel value;
   identifying edge pixels in the comparison image;
   generating a comparison edge image by assigning the first pixel value to the edge pixels of the comparison image and the second pixel value to non-edge pixels of the comparison image;
   generating a difference image based on the first edge image and the comparison edge image;
   reducing noise in the difference image by an erosion operation;
   determining difference between the first edge image and the comparison edge image by obtaining pixels having the first pixel value in the generated difference image after noise reduction, wherein the difference comprises distances in the horizontal and vertical directions between the obtained pixels having the maximum coordinate value and the minimum coordinate value and a number count of the obtained pixels in the difference image;
   determining whether the difference between the first edge image and the comparison edge image meets or exceeds a second threshold, the second threshold being adjustable by a user, wherein the determine whether the difference between the first edge image and the comparison edge image meets or exceeds a second threshold comprises:
      determining whether distances in the horizontal or vertical directions between the obtained pixels having the maximum coordinate value and the minimum coordinate value meets or exceeds a third threshold,
      determining whether a number count of the obtained pixels in the difference image meets or exceeds a fourth threshold; and
   if the difference meets or exceeds the second threshold, generate an alert indicating that a motion event occurs, and transmit the alert to a user device, the alert including image data associated with the motion event.

10. The non-transitory computer-readable storage medium of claim 9, wherein the generating a difference image based on the first edge image and the comparison edge image comprises:
   identifying a first group of pixels in the first edge image that have a different pixel value from corresponding pixels in the comparison edge image;
   identifying a second group of pixels in the first edge image that have a same pixel value as corresponding pixels in the comparison edge image; and
   generating the difference image by assigning a first pixel value to the first group of pixels and a second pixel value to the second group, the first pixel value being different from the second pixel value.

* * * * *